(12) United States Patent
Seino et al.

(10) Patent No.: US 7,452,587 B2
(45) Date of Patent: Nov. 18, 2008

(54) POLYESTER RESIN COMPOSITION FOR LIGHT-REFLECTING ARTICLE

(75) Inventors: Koichi Seino, Nagoya (JP); Masahiro Nishizawa, Nagoya (JP); Takamasa Owaki, Konan (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 11/659,706

(22) PCT Filed: Jul. 8, 2005

(86) PCT No.: PCT/JP2005/012642

§ 371 (c)(1), (2), (4) Date: Feb. 15, 2007

(87) PCT Pub. No.: WO2006/016458

PCT Pub. Date: Feb. 16, 2006

(65) Prior Publication Data

US 2007/0254150 A1 Nov. 1, 2007

(30) Foreign Application Priority Data

Aug. 11, 2004 (JP) .............................. 2004-233995

(51) Int. Cl.
- B32B 15/09 (2006.01)
- B32B 27/18 (2006.01)
- B32B 27/20 (2006.01)
- B32B 27/36 (2006.01)

(52) U.S. Cl. .................. 428/141; 428/323; 428/325; 428/328; 428/329; 428/330; 428/331; 428/457; 428/458; 428/480; 524/442; 524/444; 524/445; 524/447; 524/413; 524/400

(58) Field of Classification Search .................. None
See application file for complete search history.

(56) References Cited

U.S. PATENT DOCUMENTS

| | | | | |
|---|---|---|---|---|
| 3,619,266 A | * | 11/1971 | Weissermal et al. | 524/114 |
| 3,843,615 A | * | 10/1974 | Herwig et al. | 525/444 |
| 3,953,394 A | * | 4/1976 | Fox et al. | 524/86 |
| 4,086,212 A | * | 4/1978 | Bier et al. | 528/302 |
| 4,113,692 A | * | 9/1978 | Wambach | 524/537 |
| 4,115,333 A | * | 9/1978 | Phipps et al. | 524/399 |
| 4,203,887 A | * | 5/1980 | Goedde et al. | 524/262 |
| 4,246,378 A | * | 1/1981 | Kometani et al. | 525/438 |
| 4,257,937 A | * | 3/1981 | Cohen et al. | 524/445 |
| 4,267,286 A | * | 5/1981 | Campbell | 525/176 |
| 4,280,949 A | * | 7/1981 | Dieck | 524/445 |
| 4,284,540 A | * | 8/1981 | Iida et al. | 524/400 |
| 4,340,646 A | * | 7/1982 | Ohno et al. | 428/429 |
| 4,351,758 A | * | 9/1982 | Lu et al. | 524/227 |
| 4,364,637 A | * | 12/1982 | Ohno et al. | 359/884 |
| 4,393,153 A | * | 7/1983 | Hepp | 523/201 |
| 4,414,352 A | * | 11/1983 | Cohen et al. | 524/443 |
| 4,429,004 A | * | 1/1984 | Breitenfellner | 428/324 |
| 4,461,871 A | * | 7/1984 | Kometani et al. | 525/166 |
| 4,467,057 A | * | 8/1984 | Dieck et al. | 523/212 |
| 4,489,110 A | * | 12/1984 | Bier | 427/250 |
| 4,564,658 A | * | 1/1986 | Liu | 525/177 |
| 4,623,562 A | * | 11/1986 | Breitenfellner et al. | 427/296 |
| 4,672,086 A | * | 6/1987 | Seiler et al. | 524/127 |
| 4,778,842 A | * | 10/1988 | Taniguchi et al. | 524/504 |
| 4,806,586 A | * | 2/1989 | Nakai | 524/413 |
| 4,962,148 A | * | 10/1990 | Orikasa et al. | 524/504 |
| 4,983,663 A | * | 1/1991 | Orikasa et al. | 524/504 |
| 5,034,439 A | * | 7/1991 | Breitenfellner et al. | 524/94 |
| 5,115,016 A | * | 5/1992 | Dickens et al. | 524/513 |
| 5,132,353 A | * | 7/1992 | Wallace | 524/432 |
| 5,149,734 A | * | 9/1992 | Fisher et al. | 524/423 |
| 5,175,204 A | * | 12/1992 | Orikasa et al. | 524/504 |
| 5,298,546 A | * | 3/1994 | Kirsch et al. | 524/423 |
| 5,399,605 A | * | 3/1995 | Yoshihara et al. | 524/377 |
| 6,629,769 B2 | * | 10/2003 | Kosugi et al. | 362/341 |
| 6,749,934 B2 | * | 6/2004 | Nagayama et al. | 428/364 |
| 7,115,320 B2 | * | 10/2006 | Tanaka et al. | 428/458 |
| 2003/0166812 A1 | * | 9/2003 | Taniguchi et al. | 526/274 |

FOREIGN PATENT DOCUMENTS

| | | | |
|---|---|---|---|
| JP | 11-061382 | * | 3/1999 |
| JP | 2000-035509 | * | 2/2000 |
| JP | 2003-268216 | * | 9/2003 |

* cited by examiner

Primary Examiner—Vivian Chen
(74) Attorney, Agent, or Firm—Kubovcik & Kubovcik

(57) ABSTRACT

A polyester resin composition which comprises 30 to 80 wt % of a polybutylene terephthalate resin (A), 10 to 40 wt % of a polyethylene terephthalate resin (B), 0.1 to 40 wt % of a calcined kaolin (C) having an average particle diameter of 1.5 micro meter or less and 0.1 to 40 wt % of a spherical inorganic filler (D) is excellent in direct metal vapor deposition ability, and a light-reflecting article comprising a molded article from the resin composition and a vapor deposited metal film formed on part or whole of the surface of the molded article provides a high brightness feeling and is free from lowering of the brightness feeling due to shadowing after high temperature exposure, and thus can be suitably used as a housing, a reflector or an extension in an automobile lamp, a lighting apparatus in a household electrical appliance, or the like.

10 Claims, No Drawings

POLYESTER RESIN COMPOSITION FOR LIGHT-REFLECTING ARTICLE

This application is a 371 of international application PCT/JP2005/012642, which claims priority based on Japanese patent application No. 2004-233995 filed Aug. 11, 2004, which is incorporated herein by reference.

TECHNICAL FIELD

The present invention relates to a polyester resin composition used for producing a light-reflecting article, and a light-reflecting article which is a molded article obtainable by molding said polyester resin composition, and on part or whole surface thereof a vapor deposited metal film is formed, and said vapor deposited metal film and surface of said molded article contact with each other.

BACKGROUND ART

Conventionally, as reflecting articles such as a housing, a reflector or an extension in an automobile lamp, a lighting apparatus in a household electrical appliance or the like, a metallic product (metal plate), a product in which a thermosetting resin represented by bulk molding compound (BMC) or sheet molding compound (SMC) is metal plated or vapor deposited or coated with a metal film, has been used. The metallic reflecting article is inferior in processability, heavy and not easy handling. On the other hand, the reflector in which a thermosetting resin is metal plate processed or vapor deposited with a metal film has excellent properties in heat resistance, rigidity,. dimensional stability, etc., but it has problems that the molding cycle is long, that a flash is formed at the molding, or that a monomer may vaporize to worsen the working environment. For that reason, a thermoplastic resin vapor deposited thereon a metal film which has not such problems and is excellent in productivity has become a major trend, accompanied by improvement of functionality and diversification of design of these light-reflecting articles.

As such a production method of the light-reflecting article, a method to treat the portion to be light-reflecting surface with a primer to impart surface smoothness, then to vapor deposit a metal, and further, to coat with a top coat, can be mentioned. However, the above-mentioned conventional method to coat a primer is not preferable for environment since organic solvent is used for the primer, and further, there was a problem that the metal plate processing or the vapor deposition is expensive and the total cost is also high since it takes a long time to evaporate the above-mentioned organic solvent and to cure the coated film. Accordingly, a thermoplastic resin composition for light-reflecting article capable of being directly vapor deposited which can be processed in a low cost without pretreatment has been demanded.

In order to respond to the requirement for such a thermoplastic resin composition for light-reflecting article, in the patent reference 1, a resin composition in which polycarbonate and a fine powdered filler are compounded to polybutylene terephthalate is proposed. And, in the patent reference 2, a method in which a fine powdered filler is used as a reinforcing material to a resin composition comprising a polyalkylene terephthalate-based resin and a silicone oil, is proposed. In addition, in the patent reference 3, a reflecting article in which a reflecting metal layer is provided on polybutylene terephthalate or copolyester containing a finely powered filler.

However, in case where the resin composition described in the patent reference 1 is used, releasability is not good and molding cycle is not short, in addition, the brightness feeling decreases when the light-reflecting article, on part or whole surface of which a vapor deposited metal film is formed, is exposed to a high temperature. And, in case where the resin composition described in the patent reference 2 is used, its rigidity is insufficient, and when a primer is not used to the surface of the molded article, the brightness feeling of the light-reflecting article, on part or whole surface of which a deposited metal layer is formed, is often unsatisfactory. In the reflecting article described in the patent reference 3, when a directly vapor deposited metal film is formed, the brightness feeling is insufficient.

Patent reference 1: JP-A-1999-101905
Patent reference 2: JP-A-1999-61382
Patent reference 3: Specification of U.S. Pat. No. 4,429,004

DISCLOSURE OF THE INVENTION

Problem to be solved by the Invention

The purpose of the present invention is to provide a polyester resin composition capable of being made into a molded article excellent in direct metal vapor deposition ability, surface smoothness, impact resistance and releasability, and to provide a light-reflecting article, excellent in brightness feeling, in which a vapor deposited metal film is formed to the molded article of said polyester resin composition.

Means for Solving the Problem

We, inventors, made every effort to solve the problem, and as a result, found that the above-mentioned, problem can be solved by using a polyester resin composition containing polybutylene terephthalate resin, polyethylene terephthalate resin, calcined kaolin and a spherical inorganic filler in a specified ratio, and arrived at the present invention.

That is, the present invention provides:.

(1) A polyester resin composition which comprises, based on 100 wt % of the total polyester resin composition, 30 to 80 wt % of a polybutylene terephthalate resin (A), 10 to 40 wt % of a polyethylene terephthalate resin (B), 0.1 to 40 wt % of a calcined kaolin (C) having an average particle diameter of 1.5 micro meter or less and 0.1 to 40 wt % of a spherical inorganic filler (D).

(2) A polyester resin composition according to Claim 1, wherein a centerline average roughness, defined in ISO3274, of which molded article, prepared by using a mirror surface mold having a centerline average roughness is 1.0 nm or less, is 5.0 to 20.0 nm.

(3) A polyester resin composition according to Claims 1 or 2, wherein the spherical inorganic filler (D) is consisting of barium sulfate (D-1) and/or titanium oxide (D-2).

(4) A polyester resin composition according to any one of Claims 1 to 3, wherein surface of a calcined kaolin (C) having an average particle diameter of 1.5 micro meter or less is treated.

(5) A polyester resin composition according to any one of Claims 1 to 4, which contains 0.001 to 5.0 wt % releasing agent (E) based on 100 wt % of the total polyester resin composition.

(6) A polyester resin composition according to Claim 5, wherein the releasing agent (E) is a montanic acid complex ester wax.

(7) A light-reflecting article comprising a molded article produced with the polyester resin composition described in any one of Claims 1 to 6, and a vapor deposited metal film being formed on part or whole surface thereof, and said vapor deposited metal film contacting with the surface of said molded article.

Effect of the Invention

The polyester resin composition of the present invention is excellent in direct metal vapor deposition ability, and is capable of providing a molded article excellent in surface appearance represented by surface smoothness. And, the light-reflecting article, in which a vapor deposited metal film is formed to a part or whole surface of the molded article obtained by molding the polyester resin composition of the present invention and said vapor deposited metal film contacts with the surface of said molded article, has a high brightness feeling, and in addition, decrease of brightness feeling due to a shadow after high temperature exposure is remarkably small. In addition, the above-mentioned light-reflecting article can be suitably used as a housing, a reflector or an extension in an automobile lamp, a lighting apparatus in a household electrical appliance, or the like.

DESIRABLE MODES FOR CARRYING OUT THE INVENTION

The present invention is explained in detail below.

The polybutylene terephthalate resin (A) constituting the present invention is a polymer obtainable by ordinary polymerization methods such as condensation polymerization of terephthalic acid or its ester formable derivatives with 1,4-butane diol or its ester formable derivatives as main components, and, other copolymerizable components may be included in a range which does not spoil its properties, for example, about 20 wt % or less. As preferable examples of such (co)polymer, polybutylene terephthalate, polybutylene (terephthalate/isophthalate), polybutylene (terephthalate/adipate), polybutylene (terephthalate/sebacate), polybutylene (terephthalate/decane dicarboxylate), polybutylene (terephthalate/naphthalate), poly(butylene/ethylene)terephthalate, etc., are mentioned, and they may be used alone or by mixing two or more species.

It is preferable that the polybutylene terephthalate resin (A) used in the present invention preferably has an intrinsic viscosity measured in o-chlorophenol at 25° C. of in the range of 0.36 to 1.60, especially, 0.52 to 1.25. If the intrinsic viscosity is less than 0.36, mechanical properties become insufficient, on the other hand, if the intrinsic viscosity exceeds 1.60, moldability may become inferior.

It is preferable that the compounding ratio of the polybutylene terephthalate resin (A) of the present invention is preferably 30 to 80 wt % based on the total polyester resin composition of the present invention, more preferably, 35 to 75 wt %, still more preferably 45 to 70 wt %. If the compounding ratio of the polybutylene terephthalate resin (A) is less than 30 wt %, releasability of the resin composition at injection molding is poor to make the molding cycle inferior, and if it exceeds 80 wt %, surface appearance of the resin composition may become poor.

The polyethylene terephthalate resin (B) constituting the present invention is a polymer obtainable by ordinary polymerization methods such as condensation polymerization of terephthalic acid or its ester formable derivatives with ethylene glycol or its ester formable derivatives as main components, and, other copolymerizable components may be included in a range which does not damage-its properties, for example, about 20 wt % or less. As preferable examples of such (co)polymer, polyethylene (terephthalate/isophthalate), polyethylene (terephthalate/adipate), polyethylene(terephthalate/sebacate), polyethylene(terephthalate/decane dicarboxylate), polyethylene (terephthalate/naphthalate), poly(butylene/ethylene)terephthalate, etc., are mentioned, and they may be used alone or by mixing two or more species. By using the above-mentioned polyethylene terephthalate resin (B), it becomes possible to make good moldability compatible with direct metal vapor deposition ability.

It is preferable that the polyethylene terephthalate resin (B) used in the present invention preferably has an intrinsic viscosity measured in o-chlorophenol at 25° C. of in the range of 0.30 to 1.60, especially, 0.45 to 1.35. If the intrinsic viscosity is less than 0.30, mechanical properties become insufficient, on the other hand, if the intrinsic viscosity exceeds 1.60, moldability may become inferior.

It is preferable that the compounding ratio of the polyethylene terephthalate resin (B) of the present invention is 10 to 40 wt % based on the total polyester resin composition, more preferably, 15 to 35 wt %, still more preferably 20 to 30 wt %. If the compounding ratio of the polyethylene terephthalate resin (B) is less than 10 wt %, surface appearance of the resin composition may become poor, and if it exceeds 40 wt %, releasability of the resin composition at injection molding becomes poor, and molding cycle is likely to become inferior.

The calcined kaolin (C) used in the present invention is made by firing and dehydrating aluminium silicate hydrate represented by the basic chemical formula, $Al_2OSi_2O_5(OH)_4.nH_2O$. In the present invention, among them, it is preferable to use kaolin calcined in a condition of 600° C. or higher and 1500° C. or lower. If an uncalcined kaolin is used, it is not preferable since mechanical properties of the resin composition may become poor. An average particle diameter of the calcined kaolin (C) is preferably 1.5 micro meter or less and 0.1 μm or more. If the average particle diameter exceeds 1.5 micro meter, it is not preferable since the direct metal vapor deposition ability becomes inferior. That is, by using a calcined kaolin of an average particle diameter of 1.5 micro meter or less and 0.1 micro meter or more, it becomes possible to make the mechanical properties compatible with the direct metal vapor deposition ability.

In addition, the calcined kaolin (C) is preferably surface treated with vinylsilane compounds such as vinyltriethoxysilane and vinyltrichlorosilane, epoxysilane compounds such as gamma-glycidoxypropyl trimethoxysilane, gamma-glycidoxypropyl triethoxysilane, and beta-(3,4-epoxy cyclohexyl) ethyl-trimethbxysilane, aminosilane compounds such as gamma-(2-aminoethyl)aminopropylmethyl dimethoxysilane, gamma-(2-aminoethyl)aminopropyl trimethoxysilane and gamma-aminopropyl trimethoxysilane, long-chain fatty acids or long-chain aliphatic alcohols such as stearic acid, oleic acid, montanic acid and stearyl alcohol, more preferably, the calcined kaolin is surface treated with vinylsilane compounds, still more preferably, the calcined kaolin is surface treated with vinyltriethoxysilane. As the calcined kaolin surface treated with vinyltriethoxysilane, "Translink77" produced by Hayashi-Kasei Co., Ltd. (average particle diameter: 1.4 micro meter) can be mentioned as a preferable example.

It is preferable that the compounding ratio of the calcined kaolin (C) of the present invention is 0.1 to 40 wt % based on the total polyester resin composition, more preferably, 1 to 30 wt %, still more preferably 3 to 15 wt %. If the compounding ratio of the calcined kaolin (C) is less than 0.1 wt %, the brightness feeling decreases when the light-reflecting article to which a directly vapor deposited metal film is formed is exposed to a high temperature, and if it exceeds 40 wt %, the direct metal vapor deposition ability becomes poor due to surface exposure of the filler.

In the present invention, it is preferable to use a spherical inorganic filler (D). As the spherical inorganic filler (D), silicates such as zeolite, sericite, pyrophyylite, bentonite and alumina silicate, metal compounds such as alumina, silicon oxide, magnesium oxide, zirconium oxide, titanium oxide and iron oxide, carbonates such as calcium carbonate, magnesium carbonate and dolomite, sulfates such as calcium sulfate and barium sulphate, hydroxides such as calcium hydroxide and aluminium hydroxide, glass beads, ceramic beads, boron nitride, silicon carbide and sillica are mentioned, and these fillers can also be used two or more species in combination. Among them, it is preferable to use barium sulfate and/or titanium oxide to achieve a highly mirror like nature and a high brightness feeling of the light-reflecting article.

It is preferable that the compounding ratio of the spherical inorganic filler (D) of the present invention is 0.1 to 40 wt % based on the total weight of the polyester resin composition, more preferably, 1 to 30 wt %, still more preferably 3 to 15 wt %. If the compounding ratio of the spherical inorganic filler (D) is less than 0.1 wt %, the highly mirror like nature and the high brightness feeling cannot be achieved, and if it exceeds 40 wt %, the direct metal vapor deposition ability becomes poor due to surface exposure of the filler.

In the present invention, it is preferable to further compound a releasing agent (E) to the polyester resin composition, for shortening the molding cycle. By compounding the releasing agent (E), friction with the mold decreases and becomes slippery, to thereby make it possible to shorten cooling time at injection molding, and it becomes possible to shorten the molding cycle. As the releasing agent (E), vegetable waxes such as carnauba wax and rice wax, animal based waxes such as bees wax and lanolin, mineral based waxes such as montanic wax, montanic acid ester wax and montanic acid complex ester wax, petroleum based waxes such as paraffin wax and polyethylene wax, oil or fat based waxes such as castor oil and its derivatives, and fatty acids and their derivatives, are included, and two or more species of these waxes can also be used in combination. Among them, it is preferable to use montanic acid ester wax or montanic acid complex ester wax to achieve a highly mirror like nature and a high brightness feeling of the light-reflecting article, and it is more preferable to use montanic acid complex ester wax.

The montanic acid complex ester wax of the present invention is a kind of fossil wax and is a wax obtainable by esterification of montanic acid, obtained by pulverizing and extraction of vegetable oil component obtained from coal, with an alcohol or a dicarboxylic acid. The "complex" means that it is processed into high molecular with a trivalent alcohol at the esterification. The above-mentioned montanic acid complex ester wax has a low content of low molecular weight component, and since evaporation of gaseous component at high temperature is decreased, it is possible to make the good moldability at injection molding compatible with a high retention of brightness feeling when the light-reflecting article, to which a directly vapor deposited metal film is formed, is exposed to a high temperature.

It is preferable that the compounding ratio of the releasing agent (E) is 0.001 to 5.0 wt % based on the total polyester resin composition, more preferably, 0.003 to 4.5 wt %, still more preferably 0.1 to 4.0 wt %. If the compounding ratio is less than 0.001 wt %, a failure of releasing at injection molding may occur, and if it is more than 5.0 wt %, due to evaporation of gaseous component, brightness feeling decrease may occur when the light-reflecting article, to which a directly vapor deposited metal film is formed, is exposed to a high temperature.

To the polyester resin composition of the present invention, in a range which does not damage the effects of the present invention, it is possible to add an ordinary additive such as an antioxidant, a stabilizer, an ultraviolet absorber, a colorant, a flame proofing agent, a flame proofing auxiliary agent, an impact resistant improving agent and a lubricant, and a small amount of other polymer.

As examples of antioxidants, phenol based compounds such as 2,6-di-t-butyl-4-methylphenol, tetrakis(methylene--3-(3,5-di-t-butyl-4-hydroxyphenyl)propionate)methane, tris (3,5-di-t-butyl-4-hydroxybenzyl)isocyanurate, sulfur based compounds such as dilauryl-3,3'-thiodipropionate, dimiristyl-3,3'-thiodipropionate, phosphorous based compounds such as trisnonylphenyl phosphite and distearyl pentaeriythritol diphosphite, are mentioned.

As the stabilizing agent, benzotriazole based compounds including 2-(2'-hydroxy-5'-methylphenyl)benzotriazole and benzophenone based compounds such as 2,4-dihydroxybenzophenone, phosphates such as mono- or distearyl phosphate and trimethyl phosphate, can be mentioned.

Since these various additives can sometimes exhibit a synergistic effect by combining two or more species, they may be used in combination.

Furthermore, for example, the additives exemplified as an antioxidant often function also as a stabilizer or an ultraviolet absorber. On the other hand, the additives exemplified as a stabilizer often has a function as an antioxidant or an ultraviolet absorber. That is, the above-mentioned classification is only for convenience and it is not a classification to restrict their effect.

As ultraviolet absorber, benzophenone based ultraviolet absorbers represented by 2-hydroxy-4-n-dodecyloxy benzophenone, 2,2'-dihydroxy-4,4'-dimethoxy benzophenone, bis(5-benzoyl-4-hydroxy-2-methoxyphenyl)methane, etc., and benzotriazole based ultraviolet absorbers represented by 2-(2'-hydroxy-5'-methylphenyl)benzotriazole, 2-(2'-hydroxy-3',5'-di-tert-amylphenyl)benzotriazole, 2-(2'-hydroxy-3',5'-bis(alpha,alpha'-dimethylbenzyl)phenyl benzotriazole, Condensates of 2,2'-methylenebis-[4-(1,1,3,3-tetramethylbutyl)-6-(2H-benzotriazol-2-yl)phenol], methyl-3-[3-tert-butyl-5-(2H-benzotriazol-2-yl)-4-hydroxyphenyl propionate and polyethylene glycol, can be mentioned.

In addition, hindered amine based light stabilizers represented by (2,2,6,6-tetramethyl-4-piperizyl)sebacate, bis(1,2, 2,6,6-pentamethyl-4-piperizyl)sebacate, tetrakis(2,2,6,6-tetramethyl-4-piperizyl)-1,2,3,4-butane tetracarboxylate, tetrakis(1,2,2,6,6-pentamethyl-4-piperizyl)-1,2,3,4-butane tetracarboxylate, poly{[6-(1,1,3,3-tetramethylbutyl)amino-1,3,5-triazine-2,4-diyl][(2,2,6,6-tetramethylpiperizyl)imino] hexamethylene-[(2,2,6,6-tetramethylpiperizyl)imino]}, polymethylpropyl 3-oxy-[4-(2,2,6,6-tetramethyl)piperizinyl]siloxane, etc., can be included. These light stabilizers, in combination with the above-mentioned ultraviolet absorbers or various antioxidants, exhibit excellent properties in weather resistance, etc.

As the flame proofing agent, there are halogen based, phosphate based, metal salt based, phosphorous, silicon based, metal hydrate based or the like, and anti-dropping agent is also included. As the colorant, organic dyes, organic pigments, inorganic pigments or the like are mentioned. Other than those, fluorescent whitening agents, photoluminescent pigments, fluorescent dyes, flowability improving agents, inorganic or organic anti-bacterial agents, photo-catalyst based soil releasing agents, impact resistance improving agents represented by graft rubbers, ultra-red absorbers, photochromic agents, etc., can be mentioned.

It is preferable that the compounded components of the polyester resin composition of the present invention are uniformly dispersed, and the compounding method can be selected arbitrarily. As typical examples, methods for melt-kneading at 200 to 350° C. using well-known melt mixers such as a single or twin screwed extruder, a Banbury mixer, a kneader, mixing rolls or the like, can be mentioned. Respective components may also be melt-kneaded after being mixed together. In addition, it is preferable that the water content of the respective components are low, and it is preferable to dry beforehand, but it is necessary not required that all components are dried.

As a preferable example of producing the polyester resin composition of the present invention, a method of supplying and melt-kneading a starting material in which (A) to (D) and other additives are compounded by a twin screwed extruder of cylinder temperature of 230 to 300° C., is mentioned.

When the polyester resin composition of the present invention is molded by a mirror surface mold having a centerline average roughness, defined in ISO 3274, is 1.0 nm, it is preferable that the centerline average roughness of the molded article surface is 5.0 to 20.0 nm. The centerline average roughness of the molded article surface of the present invention is determined by measuring the centerline average roughness (Ra), defined in ISO 3274, by the surface roughness tester "SURFTEST-500" of Mitsutoyo Corp., at arbitrarily selected 10 points in a mirror surface portion of the mirror surface square plate which is injection molded under conditions of cylinder temperature of 270° C., mold temperature of 80° C. and the centerline average roughness of mirror portion of the mold of 1.0 nm. If the centerline average roughness of the molded article made from the polyester resin composition of the present invention is less than 5.0 nm, it is not preferable since the molded article may not be released from the mold, and if the center average roughness exceeds 20.0 nm, it is not preferable since direct metal vapor deposition ability may decrease, and when a vapor deposited metal film is formed to the molded article surface without a primer treatment, the brightness feeling of the light-reflecting article, in which said vapor deposited metal film and the surface of said molded article contact, is inferior.

The polyester resin composition of the present invention is molded by well known molding methods for thermoplastic resin such as injection molding, extrusion molding, blow molding, transfer molding and vacuum molding, but among them, it is more preferably molded by injection molding. When it is molded by an injection molding, it is preferable to control the cylinder temperature at about 20 to 50° C. higher than the melting point of the resin composition, and the mold temperature at 60 to 120° C.

The light-reflecting article of the present invention is produced by injection molding the polyester resin composition, and vapor depositing a metal film to the obtained molded article. As a preferable example of metal vapor deposition method, a method of direct vapor deposition of heated and evaporated aluminum without using a primer, by the vacuum vapor deposition apparatus E-250A type of Shimazu Corp., is mentioned. By this method, environmental load is made small since products can be produced without using organic solvent which has been conventionally necessary for primer treatment, in addition, since evaporating step for the organic solvent becomes unnecessary, it is possible to remarkably simplify the process, to thereby reduce the cost.

The light-reflecting article of the present invention is excellent in brightness feeling, and since it can be produced in a low cost and without environmental load, it can be suitably used as a housing, a reflector or an extension in an automobile lamp, a lighting apparatus in a household electrical appliance, or the like.

EXAMPLES

The present invention is further explained in detail with reference to the examples below.

The evaluation methods in Examples and Comparative examples are explained below.

(1) Evaluation of Surface Roughness <Centerline Average Roughness (Ra)>

The centerline average roughness Ra, defined in ISO 3274, was measured by the surface roughness tester "SURFTEST-500" of Mitsutoyo Corp., at arbitrarily selected 10 points in a mirror surface portion of a mirror surface square plate which is injection molded under conditions of cylinder temperature of 270° C., mold temperature of 80° C. and centerline average roughness of mirror portion of the mold of 1.0 nm, and the average value was determined. The smaller the numerical value, the higher the surface smoothness.

(2) Evaluation of Direct Metal Vapor Deposition Ability

A mirror surface square plate which is injection molded under conditions of cylinder temperature of 270° C., mold temperature of 80° C. and centerline average roughness, defined in ISO 3274, of mirror portion of the mold of 1.0 nm, is directly vapor deposited with aluminum by E-250A type vacuum vapor deposition apparatus of Shimazu Corp., and subjected to a visible inspection. A surface with no shadow which is very excellent in brightness feeling was classified as ⊚⊚; a surface without no shadow which has brightness feeling was classified as ⊚; a surface with a slight shadow but which has no substantial problem to brightness feeling was classified as ○; a surface with shadow as a whole which is inferior in brightness feeling was classified as x.

(3) Evaluation of Brightness Feeling After High Temperature Exposure

After exposing the above-mentioned light-reflecting article at 160° C. for 72 hours, it was evaluated by a visible inspection in the same way as that of the direct metal vapor deposition ability.

(4) Evaluation of Releasability

At the injection molding under cylinder temperature of 270° C., mold temperature of 80° C., if the ejector pin did not cut into the plate and there was no sprue breakage, it was classified as ○; although the ejector pin cut into the plate, if there was no sprue breakage and notable deformation, it was classified as Δ; if there was a sprue breakage, it was classified as x.

(5) Evaluation of Impact Resistance (Impact Strength)

A test piece of 3.0 mm thickness for Izod impact test was injection molded under conditions of cylinder temperature of 260° C., mold temperature of 80° C., and used as the sample. Notched Izod impact strength was determined according to ASTM D256.

(7) Evaluation of Rigidity (Flexural Modulus)

It was evaluated according to the method of ASTM D790. The thickness of the test piece was 3.2 mm, and it was molded under conditions of cylinder temperature of 260° C. and mold temperature of 80° C.

The compounded composition used in the examples and the comparative examples are shown below.

(A-1) Polybutylene terephthalate resin: "Toraycon 1200S" of Toray Industries, Inc., intrinsic viscosity 1.25, chloroform extract 0.6% (hereunder, also referred to as PBT)

(A-2) Polybutylene terephthalate resin: "Toraycon 1100S" of Toray Industries, Inc., intrinsic viscosity 0.89, chloroform extract 1.05% (hereunder, also referred to as PBT)

(A-3) Polybutylene terephthalate resin: Intrinsic viscosity 1.25, chloroform extract 0.15% (hereunder, also referred to as PBT)

(B-1) Polyethylene terephthalate resin: "TSB 900" of Toray Industries, Inc., intrinsic viscosity 0.90 (hereunder, also referred to as PET)

(C-1) Calcined kaolin: "Translink 77" of Hayashi-Kasei Co.,Ltd. average particle diameter=0.8 micro meter, surface treated with vinyltriethoxysilane (C-2) Calcined kaolin: "Satintone W" of Hayashi-Kasei Co.,Ltd. average particle diameter=1.4 micro meter, not surface treated (D-1) Barium sulfate: "B-55" of Sakai Chemical Industry Co., average particle diameter=0.66 micro meter (D-2)Titanium oxide: "CR-63" of Ishihara Sangyo Kaisha, Ltd., average particle diameter=0.21 micro meter, rutile form titanium oxide produced by a method using chlorine and treated with both of alumina hydrate and silicate hydrate (E-1) Montanic acid complex ester wax: "Licolub WE 40" of Clariant(Japan)K.K.

(E-2) Montanic acid complex ester wax: "Licowax OP" of Clariant(Japan)K.K.

(F) Aromatic polycarbonate resin: "A 1900" of Idemitsu Kosan Co. Ltd., number average molecular weight 19,000 (hereunder, also referred to as PC)

(G) Talc: "LMS300" of Fuji Talk Industrial Co., Ltd., average particle diameter=1.0 micro meter (H-1) Uncalcined kaolin: "ASP200" of Hayashi-Kasei Co., Ltd. average particle diameter=0.4 micro meter, not surface treated (H-2) Uncalcined kaolin: "ASP400" of Hayashi-Kasei Co., Ltd. average particle diameter=4.8 micro meter, not surface treated Examples 1 to 9

(A) to (E) were compounded in combinations shown in Table 1.

The starting materials described in each example were prepared in the following way. That is, they were prepared by a twin screwed extruder with screw diameter of 57 mm $\phi$ of which cylinder temperature was maintained at 250° C. All of (A) to (E) and other additives were fed from the first inlet and melt-kneaded, and after the strand extruded from the dice was cooled in a cooling bath, it was pelletized by a strand cutter. After each of the obtained pellets was dried by a hot air dryer at 130° C. for more than 3 hours, it was molded and evaluated according to the methods described in the above-mentioned evaluation methods.

The results were shown in Table 1. All of the obtained compositions were excellent in direct metal vapor deposition ability, surface smoothness, releasability, impact resistance and brightness feeling after high temperature exposure.

Comparative Examples 1 to 9

The compounding ratios in the comparative examples and their evaluation results were shown in Table 2.

As shown in Table 2, except changing the composition of the resin compositions, they were pelletized, molded and subjected to the various evaluations in the same way as Example 1. The obtained compositions were inferior in at least one of the direct metal vapor deposition ability, the surface smoothness, the releasability and the impact resistance.

In Comparative examples 5 and 9 in which uncalcined kaolin was used or particle diameter of kaolin was not in the range of the present invention, the impact resistance was inferior or the direct metal vapor deposition ability and the brightness feeling after high temperature exposure were inferior.

Example 10

With the resin composition of Example 1, a mirror surface square plate is injection molded under conditions of cylinder temperature of 270° C., mold temperature of 80° C. and centerline average roughness, defined in ISO 3274, of mirror portion of the mold of 1.0 nm, and it is directly vapor deposited with aluminum by E-250A type vacuum vapor deposition apparatus of Shimazu Corp., to thereby prepare a light-reflecting article on which surface a vapor deposited metal film is formed and said vapor deposited metal film contacts with said molded article. As a result of visible inspection of this light-reflecting article, there was no shadow on its surface, and it was suitable as a housing, a reflector or an extension in an automobile lamp, a lighting apparatus in a household electrical appliance, or the like.

Comparative Example 10

With the resin composition of Example 1, a mirror surface square plate is injection molded under conditions of cylinder temperature of 270° C., mold temperature of 80° C. and with a mold of centerline average roughness, defined in ISO 3274, of mirror portion of 1.0 nm, and it is coated with a primer and vapor deposited with aluminum by E-250A type vacuum vapor deposition apparatus of Shimazu Corp. As a result of visible inspection, the appearance was the same level as Example 8, i.e., the difference of appearances between direct metal vapor deposition and vapor deposition after primer coating was not recognized.

TABLE 1

| | | | Example | | | | | | | | |
|---|---|---|---|---|---|---|---|---|---|---|---|
| | Item | Unit | 1 | 2 | 3 | 4 | 5 | 6 | 7 | 8 | 9 |
| Compounding ratio | PBT(A-1) | Wt % | 54.8 | — | — | 54.8 | 54.8 | 64.8 | 54.8 | 54.995 | 51.5 |
| | PBT(A-2) | Wt % | — | — | 54.8 | — | — | — | — | — | — |
| | PBT(A-3) | Wt % | — | 54.8 | — | — | — | — | — | — | — |
| | PET(B-1) | Wt % | 25 | 25 | 25 | 25 | 25 | 25 | 25 | 25 | 25 |
| | Calcined kaolin (C-1) | Wt % | 10 | 10 | 10 | 10 | — | 5 | 10 | 10 | 10 |
| | Calcined kaolin (C-2) | Wt % | — | — | — | — | 10 | — | — | — | — |
| | Barium sulfate (D-1) | Wt % | 10 | 10 | 10 | — | 10 | 5 | 10 | 10 | 10 |
| | Titanium oxide (D-2) | Wt % | — | — | — | 10 | — | — | — | — | — |
| | Montanic acid complex ester wax (E-1) | Wt % | 0.2 | 0.2 | 0.2 | 0.2 | 0.2 | 0.2 | — | 0.005 | 3.5 |
| | Montanic acid ester wax (E-2) | Wt % | — | — | — | — | — | — | 0.2 | — | — |
| Properties | Surface roughness (Ra) | nm | 15 | 15 | 15 | 17 | 18 | 13 | 16 | 14 | 17 |
| | Direct metal vapor deposition ability | — | ◎ | ◎◎ | ◎ | ◎ | ◎ | ◎ | ○ | ◎ | ○ |

TABLE 1-continued

| Item | Unit | Example 1 | 2 | 3 | 4 | 5 | 6 | 7 | 8 | 9 |
|---|---|---|---|---|---|---|---|---|---|---|
| Brightness feeling after exposing at high temperature | — | ◎ | ◎◎ | ○ | ◎ | ○ | ○ | ○ | ◎ | ○ |
| releasability | — | ○ | ○ | ○ | ○ | ○ | ○ | ○ | Δ | ○ |
| Impact strength | J/m | 32 | 32 | 28 | 30 | 23 | 35 | 32 | 32 | 31 |
| Flexural modulus | GPa | 3.9 | 3.9 | 3.9 | 3.6 | 4.0 | 3.5 | 3.9 | 3.9 | 3.9 |

TABLE 2

| | Item | Unit | Comparative example 1 | 2 | 3 | 4 | 5 | 6 | 7 | 8 | 9 |
|---|---|---|---|---|---|---|---|---|---|---|---|
| Compounding ratio | PBT (A-1) | wt % | 54.8 | 54.8 | 69.8 | 79.8 | 54.8 | 54.8 | 54.8 | 74.8 | 54.8 |
| | PET (B-1) | wt % | — | 25 | 30 | — | 25 | 25 | 25 | 5 | 25 |
| | PC (F) | wt % | 25 | — | — | — | — | — | — | — | — |
| | Calcined kaolin (C-1) | wt % | 10 | 10 | — | 10 | — | — | 20 | 10 | — |
| | Uncalcined kaolin (H-1) | wt % | — | — | — | — | 10 | — | — | — | — |
| | Uncalcined kaolin (H-2) | wt % | — | — | — | — | — | — | — | — | 10 |
| | Barium sulfate (D-1) | wt % | 10 | — | — | 10 | 10 | 20 | — | 10 | 10 |
| | Talc (G) | wt % | — | 10 | — | — | — | — | — | — | — |
| | Montanic acid complex ester wax (E-1) | wt % | 0.2 | 0.2 | 0.2 | 0.2 | 0.2 | 0.2 | 0.2 | 0.2 | 0.2 |
| Properties | Surface roughness (Ra) | nm | 20 | 30 | 10 | 25 | 17 | 17 | 30 | 25 | 30 |
| | Direct metal vapor deposition ability | — | ○ | ○ | ◎ | X | ◎ | ◎ | X | X | X |
| | Brightness feeling after high temperature exposure | — | X | ○ | X | X | ◎ | X | X | X | X |
| | releasability | — | X | ○ | ○ | ○ | ○ | ○ | ○ | ○ | ○ |
| | Impact strength | J/m | 36 | 39 | 37 | 27 | 15 | 24 | 35 | 31 | 13 |
| | Flexural modulus | GPa | 3.7 | 4.3 | 2.6 | 3.7 | 4.4 | 3.4 | 4.2 | 4.1 | 4.6 |

INDUSTRIAL APPLICABILITY

The polyester resin composition for light-reflecting article of the present invention can be used as a housing, a reflector or an extension in an automobile lamp, as a reflector of down light lighting apparatus in a household electrical appliance, a reflector of linear fluorescent light, or the like.

The invention claimed is:

1. A polyester resin composition which comprises, based on 100 wt % of the total polyester resin composition, 30 to 80 wt % of a polybutylene terephthalate resin (A), 10 to 40 wt % of a polyethylene terephthalate resin (B), 0.1 to 40 wt % of a calcined kaolin (C) having an average particle diameter of 1.5 micro meter or less, 0.1 to 40 wt % of a spherical inorganic filler (D) and a releasing agent (E) which comprises a montanic acid complex acid ester.

2. A polyester resin composition according to claim 1, wherein a centerline average roughness, defined in ISO3274, of of a molded article, prepared by molding the polyester resin composition using a mirror surface mold having a centerline average roughness of 1.0 nm or less, is 5.0 to 20.0 nm.

3. A light-reflecting article comprising a molded article produced with the polyester resin composition described in claim 2, and a vapor deposited metal film formed on part or whole surface thereof, and said vapor deposited metal film contacting the surface of said molded article.

4. A polyester resin composition according to claim 1, wherein the spherical inorganic filler (D) consists of barium sulfate (D-1) and/or titanium oxide (D-2).

5. A light-reflecting article comprising a molded article produced with the polyester resin composition described in claim 4, and a vapor deposited metal film formed on part or whole surface thereof , and said vapor deposited metal film contacting the surface of said molded article.

6. A polyester resin composition according to claim 1, wherein a surface of a calcined kaolin (C) having an average particle diameter of 1.5 micro meter or less is treated.

7. A light-reflecting article comprising a molded article produced with the polyester resin composition described in claim 6, and a vapor deposited metal film formed on part or whole surface thereof, and said vapor deposited metal film contacting the surface of said molded article.

8. A polyester resin composition according to claim 1, which contains 0.001 to 5.0 wt % of the releasing agent (E) based on 100 wt % of the total polyester resin composition.

9. A light-reflecting article comprising a molded article produced with the polyester resin composition described in claim 8, and a vapor deposited metal film formed on part or whole surface thereof, and said vapor deposited metal film contacting the surface of said molded article.

10. A light-reflecting-article comprising a molded article produced with the polyester resin composition described in claim 1, and a vapor deposited metal film formed on part or whole surface thereof, and said vapor deposited metal film contacting the surface of said molded article.

* * * * *